Figure 1:
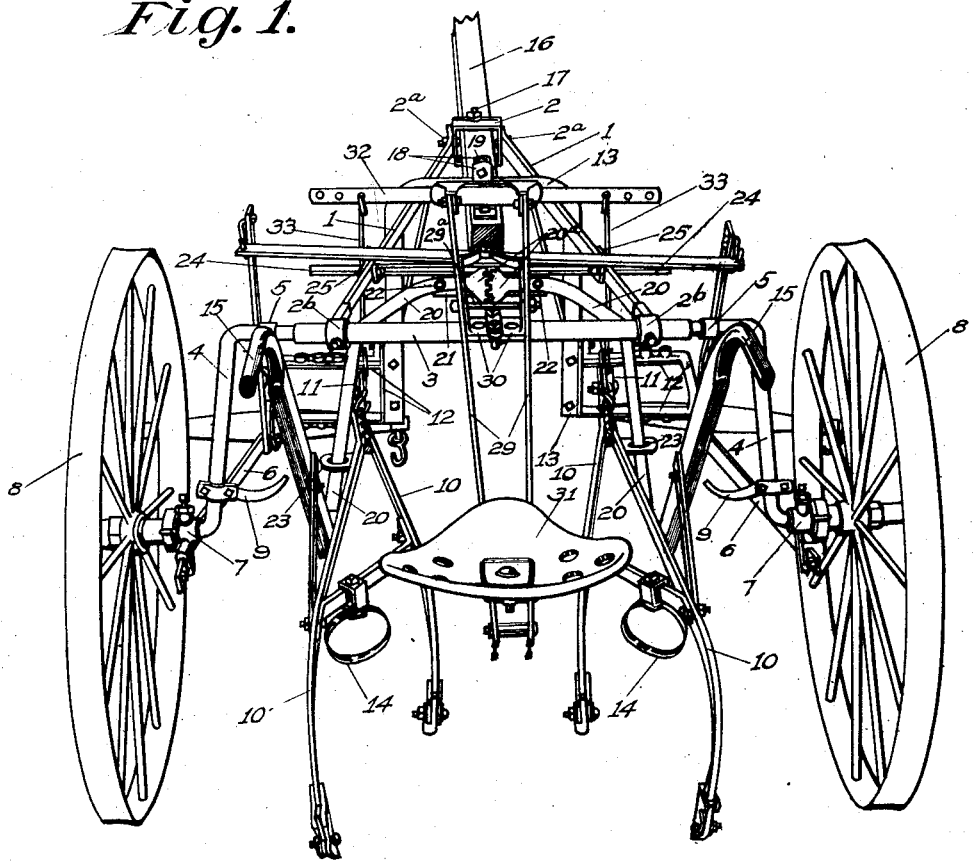

F. C. WARNE.
CULTIVATOR.
APPLICATION FILED DEC. 17, 1914.

1,259,940.

Patented Mar. 19, 1918.
2 SHEETS—SHEET 1.

Inventor
FREDERICK C. WARNE.

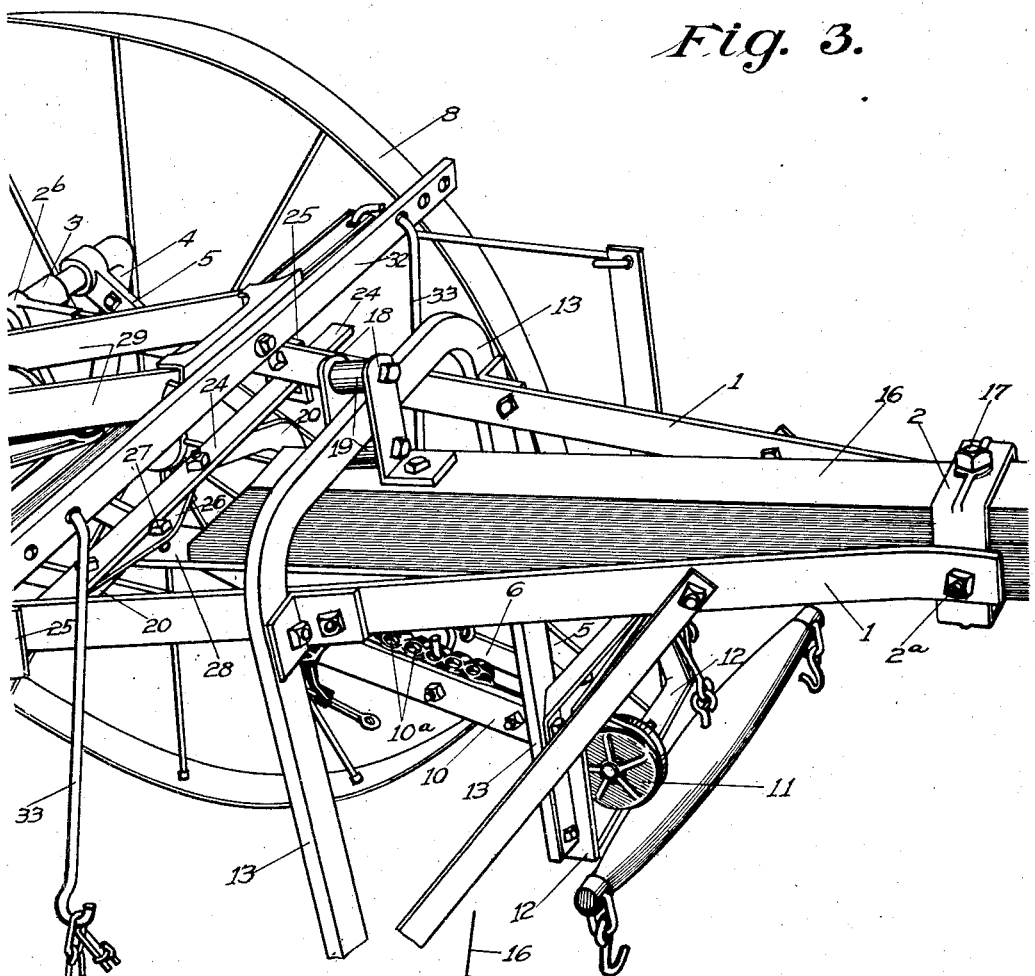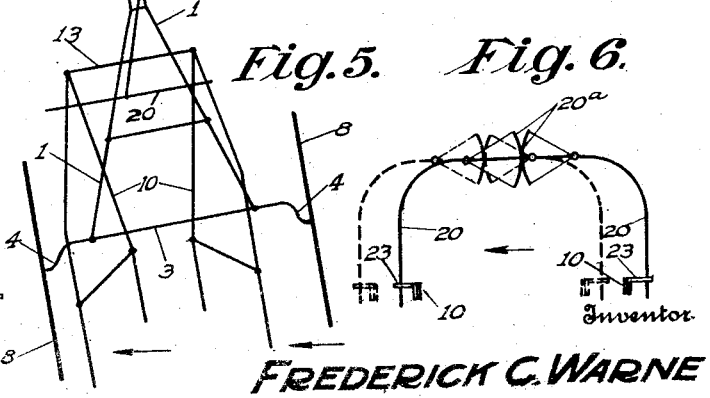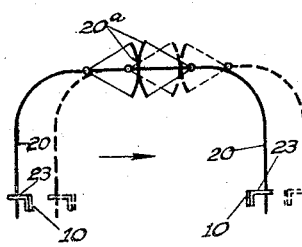

UNITED STATES PATENT OFFICE.

FREDERICK C. WARNE, OF MANSFIELD, OHIO, ASSIGNOR TO RODERICK LEAN MANUFACTURING COMPANY, OF MANSFIELD, OHIO, A CORPORATION OF NEW JERSEY.

CULTIVATOR.

1,259,940.      Specification of Letters Patent.      Patented Mar. 19, 1918.

Application filed December 17, 1914. Serial No. 877,668.

*To all whom it may concern:*

Be it known that I, FREDERICK C. WARNE, a citizen of the United States, residing at Mansfield, in the county of Richland and State of Ohio, have invented certain new and useful Improvements in Cultivators, of which the following is a specification.

My invention relates to improvements in cultivators, the present improvements being particularly designed and adapted for use in connection with a wheeled cultivator provided with pivoted cultivator gangs, the present embodiment illustrating a cultivator of the riding type.

The primary object of the invention is to provide an improved wheeled cultivator of the non-pivoted wheel type embodying and harmoniously combining all of the essential principles of operation and features of construction of the ordinary riding pivot axle and pivot gang cultivator by the provision of a laterally swinging pivot pole whereby the front of the cultivator frame and ground wheels carried thereby may be swung and inclined laterally and bodily to the right or to the left said pivot pole acting in lieu of pivot wheels by being connected to a laterally movable supporting member carrying a compensating or equalizing gang actuated yoke, whereby when the gangs are simultaneously swung laterally by the operator in the same direction or to one side, such movement will correspondingly move or actuate the cultivator frame and non-pivoted supporting wheels carried thereby in the same general direction, or in other words, laterally at an angle and relatively to the pivot pole, said gang actuated and controlling device being also adapted to permit the gangs to be moved uniformly and simultaneously toward or from each other without imparting any lateral movement to said laterally movable supporting member connected to said pivot pole, or in other words, without imparting any relative lateral or swinging movement between said pivot pole and the cultivator frame and supporting wheels.

In the present embodiment of my invention the cultivator wheel and pivot gang actuating, connecting and controlling device comprises a laterally movable supporting member connected, in the present instance, to the rear end of the pivot pole, said supporting member carrying what may be termed a "geared compensating or equalizing yoke" adapted not only to swing the supporting wheels and cultivator frame relative to the pivot pole by the simultaneous lateral swinging movement of the gangs to one side or the other and in the same general direction as hereinbefore described, but being also adapted, when one of said gangs is moved laterally and independently to one side without the concurrence or movement of the other to impart a corresponding movement to the bars proportionately or moving the parts to a position corresponding to what may be termed a "half-cut" that is to say, a movement of substantially half of the movement occasioned when both of said gangs are moved in the same direction as above indicated.

The improved gang actuated equalizing yoke is also adapted to stand neutral or out of action with respect to its lateral swinging movements and the corresponding movements imparted to the connected parts when the gangs are moved uniformly and simultaneously toward or from each other, or in other words, when the geared members of the compensating yoke are correspondingly moved toward and from each other no lateral swinging motion is imparted to the laterally movable supporting member carrying the same.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings forming a part of this specification, Figure 1, is an isometric rear view of a wheeled cultivator embodying my invention, taken from the rear end looking downwardly, the parts being shown in normal position.

Figure 2:
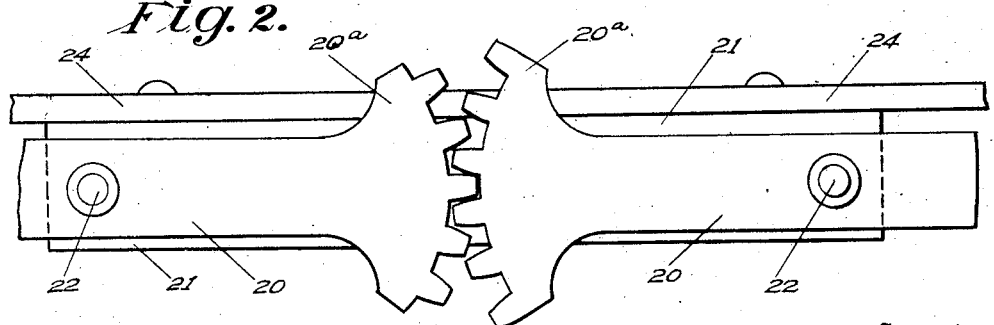

Fig. 2, an enlarged fragmentary front elevation of a pivot pole and gang connecting, controlling, and actuating device, in the present instance, in the form of a two-part geared compensating or equalizing yoke whereby the cultivator frame and wheels may be moved bodily and laterally relative to the pivot pole by the corresponding lateral movements imparted to the yoke by corresponding movements given to the pivot gangs by the operator as hereinbefore explained.

Fig. 3, an enlarged isometric view of the front or yoke and pivoted pole portion of the cultivator looking downwardly from above and at one side, one of the pivot gangs being removed for the purpose of clearer illustration of the parts.

Fig. 4, a diagrammatic view of the pivot pole and gang connecting and controlling device, in the present instance, in the form of a yoke, the arrow and dotted line position illustrating the manner in which the yoke is moved to move the front portion of the cultivator frame and wheels and the rear end of the pivot pole to the right when the cultivator gangs are moved simultaneously to the right.

Fig. 5, a diagrammatic view showing the relative position of the parts when the cultivator gangs are moved simultaneously to the left.

Fig. 6, a diagrammatic view of the yoke similar to Fig. 4 the dotted lines showing the position of the yoke members when moved simultaneously to the left when the cultivator gangs are similarly moved as indicated in Fig. 5.

Similar numerals of reference designate like parts throughout all the figures of the drawings.

The improved cultivator comprises a suitable frame consisting, in the present instance, of a pair of side members 1, extending forwardly at a converging angle and secured to each other by means of a pole bearing bracket 2, the sides of the latter being secured to the forward ends of the side members 1, by means of bolts 2ª. The rear ends of the side members 1, of the frame are provided with bearing sleeves or collars 2ᵇ, carrying a transversely extending axle sleeve or pipe 3, the ends of the latter adjustably receiving and containing the stub axles 4. The axles 4, are braced by means of forwardly inclined brace members 5, and the forwardly extending brace members 6, the rear ends of the latter being adjustably secured in the wheel axle or hub bearing brackets 7, whereby the forward inclination of the stub axles 4, may be varied or adjusted to balance the cultivator pole or tongue when the pivot cultivator gangs are elevated as hereinafter referred to.

The lower ends of the stub axles 4, are provided with ground or supporting wheels 8, and with inwardly extending brackets or gang hanger hooks 9, which latter are adapted to receive and support the pivot gangs 10, when it is desired to support the pivot gangs for transportation.

The pivot gangs 10, are pivoted for both vertical and lateral movement by means of coupling members 11, horizontally adjustable in coupling frames 12, carried at the lower ends of the gang arch 13, and the forward ends of the brace members 5 and 6.

The rear ends of the gangs 10, are provided with suitable stirrups 14, and handles 15, by means of which the gangs may be given the desired movements as hereinafter described.

The pivot pole 16, extends forwardly through the pole bearing bracket 2, and is secured therein by means of a vertically extending pivot bolt 17, whereby the rear end of the pole 16, is adapted to swing laterally upon its pivot 17, and relatively to the side members 1, of the cultivator frame and the cultivator or supporting wheels 8, for the purpose of swinging the front of the cultivator frame and the wheels carried thereby bodily to the right or to the left by the movements of the cultivator gangs as herein explained. As a means of further supporting the rear end of the pivot pole in the relative swinging or horizontal movements of the latter to the cultivator frame and wheels, suitable brackets 18, carrying guide rollers 19, are provided, said guide rollers 19, being adapted to travel upon the horizontally extending portion of the gang arch 13, as shown.

The improved pivot pole and gang connecting, actuating, and controlling mechanism whereby said pivot pole and the cultivator frame and wheels may be swung laterally and relatively to each other by the simultaneous and corresponding lateral or swinging movements of the pivot gangs, and whereby the latter may be moved uniformly toward or from each other in the active cultivation in and along the row of growing plants, without imparting any relative lateral swinging movement to the pivot tongue and cultivator frame and wheels, comprises, in its present embodiment, what may be termed a "geared compensating or equalizing gang actuated yoke" consisting of two lever members 20, pivotally mounted on a laterally movable supporting member 21, said lever members 20, being connected or geared to each other intermediate their pivots 22, in some suitable and convenient manner, as for example, by means of segmental gears 20ª, the lower ends of said lever members extending beneath and being removably connected to the cultivator beams through the medium of keeper clips or brackets 23, the latter form of connection between the gangs and the yoke or lever members 20, permitting the operator to give the pivot gangs the requisite vertical and lateral movements without any interference with the movements of the connected parts.

The laterally movable supporting member 21, carrying the yoke or lever members 20, is supported in its horizontal or laterally swinging movements by means of a cross or guide member 24, the ends of the latter extending through and being slidably mounted in guide or keeper clips 25, carried, in the present instance, upon the side members 1, of the frame. The laterally movable supporting member 21, is pivotally connected to the rear end of the pivot pole 16, through the medium of a bracket member 26, mounted upon the supporting member 21, and a pivot bolt 27, the latter extending through a rearwardly extending pole plate or bracket 28, thereby forming a flexible or pivot connection between the rear end of the pivot pole 16, and the laterally movable supporting member 21, carrying the gang actuated yoke members hereinbefore described.

By reason of the above construction it will be apparent that when the cultivator gangs are simultaneously and uniformly moved toward and from each other and the lever members 20, correspondingly moved, that no lateral movement with be imparted to the supporting member 21, and the pivot pole connected thereto, the member 21, maintaining a neutral position with respect to the rear end of the pivot pole 16, and the relative position of the cultivator frame and wheels which latter, it will be seen, are indirectly connected and actuated through the medium of the pivot pole and the laterally movable supporting member 21, carrying the gang actuated yoke members 20, but upon the simultaneous lateral movements of the gangs to the right as indicated in Fig. 4, or upon such movement to the left as indicated in Figs. 5 and 6, the rear end of the pivot pole, as likewise the front portion of the cultivator frame and wheels will be correspondingly actuated or moved, this corresponding movement or actuation to the lever being clearly indicated in Fig. 5 of the drawings.

As a further means of enabling the operator to retain complete control of each cultivator beam or gang independently of the other, moving each gang separately either vertically or horizontally, as required by the crop, or the condition or contour of the surface, or in passing obstructions, as well as providing means for counterbalancing the weight of the cultivator gangs whereby to more completely and harmoniously actuate the gangs and their connections for the purposes hereinbefore mentioned, a seat carrying lever 29, is provided, said lever, in the present instance, comprising two beam members pivotally mounted above the arch or axle portion of the cultivator frame, in the present instance, by means of a supporting plate 30, upon which the members of the seat carrying lever 29, are adapted to rock, the rear end of the seat lever being provided with a seat 31, for the operator, and the forward end of the lever being provided with a pivoted cross bar 32. The free or outer ends of the cross bar 32, are provided with depending links or connecting members 33, adapted to be hooked into a plurality of openings 10ª, of the cultivator gangs whereby the leverage exerted by the lever 29, upon the gangs may be adjusted to correspond with the weight of the operator in the seat 31.

As the further details of the present form of cultivator form no part of the present invention in so far as a clear understanding of the same is required, the same need not be described further.

The form of cultivator herein shown and described is particularly adapted to hill-side cultivation, the tendency of an ordinary cultivator on a hill-side being to creep down the hill and the operator experiences great difficulty in keeping the machine on the row and the danger is thereby incurred of plowing out the plant, but with the improved construction herein referred to, when the machine tends to creep down the hill the operator simply shifts the gangs up the incline to clear the plant and in thus shifting the gangs the latter through the yoke members pivots the pole which in turn inclines the entire frame and wheels up and toward the hill-side at an inclination thereby counteracting the tendency above referred to and enabling hill-side cultivation to be carried out with perfect ease.

From the foregoing description, taken in connection with the accompanying drawings, the operation and advantages of my invention will be readily understood.

Having thus described one of the embodiments of my invention, what I claim and desire to secure by Letters Patent, is:—

1. In a wheeled cultivator, including laterally swinging pivot gangs, and a laterally swinging pivot pole, a supporting member movably connected to said pole, and lever members movably mounted on said supporting member intercommunicating with each other and movably connected to and operated by said pivot gangs.

2. In a wheeled cultivator having a laterally swinging pole and laterally swinging gangs, pole supporting and gang connecting elements, said gang connecting elements being intergeared for a like movement toward and from each other through like movements of said gangs independently of said pole supporting member.

3. An agricultural machine, comprising a wheeled frame, laterally swinging pole and pole guiding and earth working elements carried thereby, and connecting and controlling elements between said guiding and earth working elements, said elements being movably connected to said earth working elements and movably intergeared to each other.

4. In a pivot pole wheeled cultivator, including a laterally swinging pivot pole and laterally swinging pivot gangs, a laterally movable supporting member connected to and adapted to actuate said pivot pole, and intergeared compensating gang actuated members movably carried by said supporting member and freely movable uniformly toward and from each other without movement of said supporting member and interlocking to actuate said laterally movable supporting member to the right or to the left with the like swinging movements of either or both of said gang actuated members.

5. In a cultivator, the combination with a cultivator frame and wheels, and a laterally swinging pole and laterally swinging gangs; of a laterally movable supporting member connected to and movable with said laterally swinging pole, and gang actuated intergeared elements movably carried by said supporting member for uniform movement toward and from each other and for holding said supporting member in a central or neutral position while being so moved.

6. In a cultivator, a frame provided with ground wheels and laterally swinging gangs, a laterally swinging pivot pole carried by said frame, a laterally movable supporting member connected to said pivot pole, and intergeared yoke members pivotally mounted on said laterally movable supporting member and having a vertically and laterally movable connection with said pivot gangs, said yoke members being freely movable uniformly toward and from each other independently of said supporting member but interlocking for moving the latter to one side or the other when either or both are correspondingly moved by a corresponding movement of said gangs.

7. In a cultivator, a wheel frame provided with a laterally swinging pivot pole and laterally swinging pivot gangs, a pivot pole and gang connecting device movably and flexibly interconnected therebetween for uniform to and fro movement by a like movement of sa'd gangs while holding said pole in a central position, said connecting device having gang connecting members interlocking with each other when simultaneously and correspondingly swung laterally through the single or simultaneous like movement of said gangs whereby the rear end of said pivot pole may be simultaneously and correspondingly moved.

8. In a cultivator, the combination with a wheeled frame provided with laterally swinging pivot gangs and a laterally swinging pivot pole; of a pivot pole and gang connecting device including a supporting member carrying intergeared pivot members laterally movable with respect to said frame and movably and flexibly intergeared to each other and to said pivot gangs and pole whereby the front of said frame and the rear end of said pivot pole may be swung to the right or left by the corresponding movements of said gangs, said intergeared pivot members being freely movable toward and from each other in intergeared relation on said laterally movable supporting member whereby the latter will be held in a neutral position as said gangs are correspondingly moved toward or from each other.

9. In a cultivator, a frame provided with wheels and laterally swinging pivot gangs and a laterally swinging pivot pole, and a pivot pole and gang connecting and controlling device including intergeared members freely movable uniformly toward and from each other and interlocking when simultaneously moved laterally, said intergeared members having depending portions having a vertically and laterally movable connection with said pivot gangs, said intergeared members when interlocking affording means whereby said connected end of said pivot pole and the forward portions of said cultivator frame and wheels may be simultaneously and correspondingly swung to the right or to the left by the single or simultaneous lateral movements of said gangs to one side or the other and whereby the latter may be simultaneously moved toward and from each other in interconnected relation while holding said pole connected parts in a central or neutral position.

10. In an agricultural machine, a wheeled frame carrying laterally swinging pole and earth working elements, and interconnected elements interposed between and movably connected to said pole and earth working elements, said elements connected to said earth working elements being intergeared with each other for uniform movement toward each other by said earth working elements without concurrent movement of said pole element and interlocking with each other for concurrent lateral movement of said pole element on movement of said earth working elements to one side or the other.

11. An agricultural machine, comprising a wheeled frame provided with a laterally swinging pole and laterally swinging pole guiding and earth working elements, and laterally swinging gang actuated intergeared elements movably interposed between and connected to said pole guiding and earth working elements, said gang actuated elements being movably intergeared for uniform movement toward each other without concurrent movement of said pole guiding element and interlocking with each other for concurrent like lateral movement of said guiding element when correspondingly moved by said earth working elements.

12. In combination with a cultivator provided with a laterally swinging pole and laterally swinging gangs, mechanism connecting said pole and gangs including movable intergeared elements connected to said gangs for uniform movement toward each other through a like movement of said gangs and as so moved holding said pole in a neutral or central position, said gang actuated connecting elements being mounted and arranged to interlock with each other for concurrent lateral movement of said pole by the like movements of said gang actuated elements by said gangs.

13. An agricultural machine, comprising a wheeled frame carrying a laterally swinging pole and laterally swinging earth working implements, a laterally swinging element connected to said pole, and gang actuated gang connecting elements pivotally mounted on said laterally swinging element and intergeared with each other for independent uniform movement toward each other by the like movement of said gangs and for holding said laterally swinging element in a neutral or central position while being so moved and for opposing each other for concurrent lateral movement of said laterally swinging element by a concurrent like lateral movement of said gangs.

14. In an agricultural machine, a wheeled frame, laterally swinging pole and earth working elements carried thereby, and connecting elements movably intergeared to each other and to said pole and earth working elements for movement toward and from each other irrespective of said pole and imparting movement to the latter when otherwise moved.

15. In an agricultural machine having a laterally swinging pole and laterally swinging gangs, gang connecting elements intergeared to each other and movably connected to said pole for movement toward and from each other irrespective of said pole by a corresponding movement of said gangs and interlocking with each other and imparting movement to said pole when otherwise moved by said gangs.

In testimony whereof I have affixed my signature in presence of two witnesses.

FREDERICK C. WARNE.

Witnesses:
  D. A. WEESE,
  C. A. HINES.

Copies of this patent may be obtained for five cents each, by addressing the "Commissioner of Patents, Washington, D. C."